United States Patent [19]

Frei

[11] Patent Number: 5,252,982
[45] Date of Patent: Oct. 12, 1993

[54] METHOD OF PRECISE POSITION DETERMINATION

[75] Inventor: Erwin Frei, Widnau, Switzerland

[73] Assignee: Leica Heerbrugg A.G., Heerbrugg, Switzerland

[21] Appl. No.: 849,065

[22] PCT Filed: Aug. 7, 1991

[86] PCT No.: PCT/EP91/01504

§ 371 Date: Apr. 23, 1992

§ 102(e) Date: Apr. 23, 1992

[87] PCT Pub. No.: WO92/03747

PCT Pub. Date: Mar. 5, 1992

[30] Foreign Application Priority Data

Aug. 24, 1990 [DE] Fed. Rep. of Germany ....... 4026740

[51] Int. Cl.$^5$ .......................... G01S 5/08; H04B 7/185
[52] U.S. Cl. .................................... 342/357; 342/352; 342/451; 342/463
[58] Field of Search ................ 342/357, 352, 450, 451, 342/463, 464, 465

[56] References Cited

FOREIGN PATENT DOCUMENTS 0167683 9/1989 European Pat. Off. .
WO87/06410 10/1987 PCT Int'l Appl. .

OTHER PUBLICATIONS

Frei et al., "Some Considerations Concerning an Adaptive, Optimized Technique to Resolve the Initial Phase Ambiguities for Static and Kinematic GPS Surveying-Techniques", Procedings of the Fifth International Geodetic Symposium on Satellite Positioning, Mar. 1989, pp. 671–686.
Remondi et al., "Performing Centimeter-Level Surveys in Seconds with GPS Carrier Phase: Initial Results", Proceedings of the Fourth International Geodetic Symposium on Satellite Positioning, Apr.-May, 1986, pp. 1229–1249.
Beutler, et al., "Relative Static Positioning with the Global Positioning System: Basic Technical Considerations", IAG General Meeting, Aug., 1989, pp. 20–26.
Ashkenazi et al., "Rapid Static and Kinematic GPS Surveying: With or Without Cycle Slips", Land and Minerals Surveying, vol. 7, No. 10, Oct., 1989, pp. 489–494.
Scherrer, et al., "GPS—The Surveying System of the Future", Wild Heerbrugg Ltd., 1987.
Beutler, et al., "Some Theoretical and Practical Aspects of Geodetic Positioning Using Carrier Phase Difference Observations of GPS Satellite", No. 14, pp. 1–79.
Bossler, et al., "Using the Global Positioning System (GPS) for Geodetic Positioning", Bulletin Geodesique, vol. 54, No. 2, 1980, pp. 553–563.
Beutler et al., "Using the Global Positioning System (GPS) for High Precision Geodetic Surveys: Highlights and Problem Areas", IEEE Plans 1986, Position and Navigation Symposium, Nov., 1986 pp. 243–250.
Vanicek, P., et al., "Geodesy: The Concepts", Second Edition, North Holland, 1986, pp. 214–241.
Beutler, G., "Exemplary Processing of a 1989 Campaign in the Swiss Alps", Astronomical Institute University of Berne, 1989.

Primary Examiner—John B. Sotomayor
Attorney, Agent, or Firm—Foley & Lardner

[57] ABSTRACT

The method of precise position determination, in particular for geodetic positioning by means of carrier-frequency phase-difference measurement on GPS satellites, uses a double difference ($\Delta\phi_{12}^{nm}(k)$) of a measured phase values, forms an initial solution for a position vector ($\hat{x}_{jc}$) by means of a compensation calculation, and actual phase ambiguities ($\hat{x}_{jN}$) and then integer alternative phase ambiguities ($x_{jA}$).

A rapid reduction in the number of alternative phase ambiguities ($x_{jA}$) to be processed and automatic statistical protection of the results is achieved by means of special statistical selection tests, using a corresponding cofactor matrix ($Q_{xxj}$) and an a posteriori rms error ($m_{0S}$) of the initial solution.

In this way, the required number of satellites (4 to 5) observed and the observation duration (a few minutes) can be reduced considerably, likewise the computer cost. Operator decisions are eliminated.

7 Claims, 3 Drawing Sheets

METHOD OF PRECISE POSITION DETERMINATION

BACKGROUND OF THE INVENTION

The invention relates to a method of precise position determination.

Such a method is known from Beutler, G., D. A. Davidson, R. Langley, R. Santerre, P. Vanicek, D. E. Wells (1984) in "Some Theoretical and Practical Aspects of Geodetic Positioning using Carrier Phase Difference Observations of GPS Satellites," Reports by the Zimmerwald satellite observation station, No. 14 and Department of Surveying Engineering Technical Report No. 109, University of New Brunswick, Fredericton, Canada, pp. 1-41, 78, 79, as relative static positioning using the GPS Navstar satellite navigation system.

An overview of the GPS system, the measurement variables and relative positioning is given in the Company Prospectus "GPS—The Surveying System of the Future" Wild Heerbrugg Ltd., Heerbrugg, Switzerland, 1987.

A navigation system based on the Doppler method for various installed radio satellite systems is known from EP-B 0,167,683.

In the known method for relative static positioning, measurement times of about one hour are required with five available transmitters to determine the relative position of two points 10 km apart to an accuracy in the region of one cm.

Approaches to speeding up the measurement by means of an optimized evaluation method are known from Frei, E., G. Beutler "Some Considerations Concerning an Adaptive, Optimized Technique to Resolve the Initial Phase Ambiguities", Proceedings of the Fifth International Geodetic Symposium on Satellite Positioning, Mar. 15-17, 1989, pp. 671-686, Las Cruces, New Mexico; Remondi, B. W. "Performing Centimeter Level Surveys in Seconds with GPS Carrier Phase: Initial Results". Proceedings of the Fourth International Geodetic Symposium on Satellite Positioning, Apr. 18-May 2, 1986, pp. 1229-1249, Austin, Tex.; Beutler, G., W. Gurtner, M. Rothacher, U. Wild, E. Frei "Relative Static Positioning with the Global Positioning System: Basic Technical Considerations" lecture to the IAG General Meeting, Edinburgh, August 1989; and V. Ashkenazi, P. I. Summerfield "Rapid static and kinematic GPS surveying: with or without cycle slips". Land and Minerals Surveying, Vol. 7, No. 10, 10/89, pages 489-494 (GB Journal). The content of the quoted references is part of the disclosure of this application.

The quasi-kinematic method described therein according to Remondi (loc. cit.) results in a saving in measurement time only in the case of a sequence of measurements at different points and is dependent on a receiver being able to be transported from point to point in radio contact with the transmitters, without interference. However, in general this condition is difficult to adhere to and difficult to check. Ashkenazi and Summerfield (loc. cit) solve this problem by repeated measurement at the first measurement point. The method specified by Frei and Beutler for rapid resolution of the phase ambiguity uses only the a posteriori rms error in a method according to the precharacterizing clause of claim 1 and tests all the complete alternative phase ambiguities located within an interval of plus or minus three times the a posteriori rms errors around the actual phase ambiguities for the magnitude of the rms error of the positioning vector.

With measurement times of a few minutes, this method is adequate only if 7 to 8 satellites can be received or if measurements from 5 to 6 satellites can be used on two frequencies (L1 and L2).

It is also known, from Beutler et al. for it to be possible to achieve an improvement in the method described be repeated measurement with a time interval.

SUMMARY OF THE INVENTION

It is thus the object of the invention, based on a method of precise position determination of the generic type, to achieve a significant shortening of the measurement time and/or a reduction in the number of received transmitters and frequencies, the intention being to determine each individual position independently of others or of additional preconditions. The cost in terms of computer capacity and computing time is intended to be minimal. If the transmitters and receivers are constructed in accordance with the GPS system, it is intended to facilitate geodetic position determinations reliably using four to five receivable transmitters and with a measurement time of a few minutes.

This object is achieved in the method of precise position determination of the generic type, by the introduction of the characterizing features of claim 1.

Advantageous embodiments and developments are the subject matter of claims 2 to 5.

BRIEF DESCRIPTION OF THE DRAWINGS

The invention will be described in further detail below with reference to the accompanying drawings wherein.

DESCRIPTION OF PREFERRED EMBODIMENTS

The method is used for geodetic surveying with the GPS Navsat satellite positioning system but also with other radio satellite systems, ground-supported transmitter networks and with the wavelengths used also matched to light-emitting transmitters.

The technique of surveying and navigation with such systems is characterized by a close link between radio or light transmitting and receiving technology, the technical and geometric design of transmitter networks, and by the use of comprehensive algorithms and of computers having suitable power for processing complex data and relationships in order to achieve the positioning and length and angle measured values as the measurement result. In this case, all the participating elements influence one another.

In the case of the subject matter of the application, an algorithm is introduced to determine integer phase ambiguities, with which it is possible significantly to improve the primary measured value acquisition with respect to the prior art, namely to reduce the measurement time and the number of transmitters required, while maintaining the same accuracy and improved reliability of the position determination.

Figure 1:
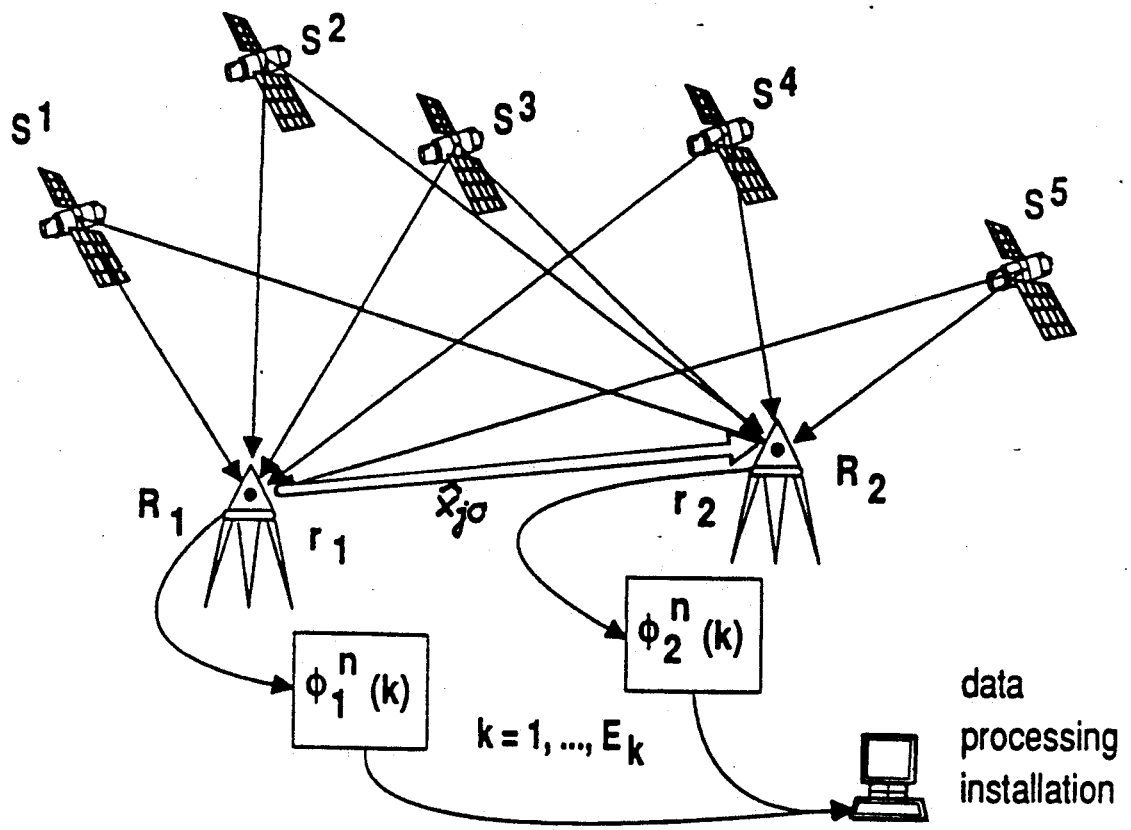
FIG. 1 illustrates a measuring arrangement for the instant invention.
Figure 2:
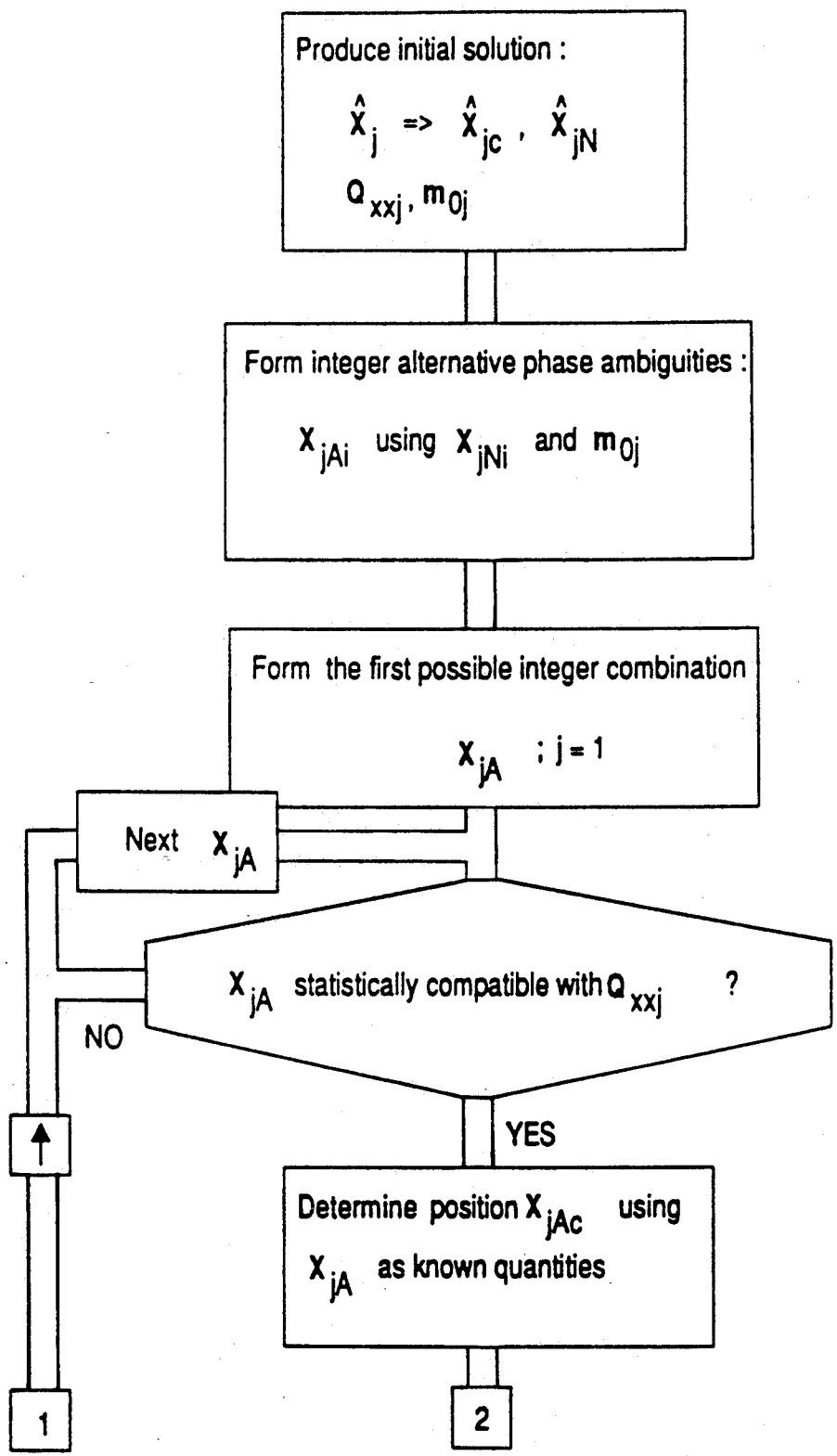
FIG. 2 is a flow diagram for the instant invention.
Figure 3:
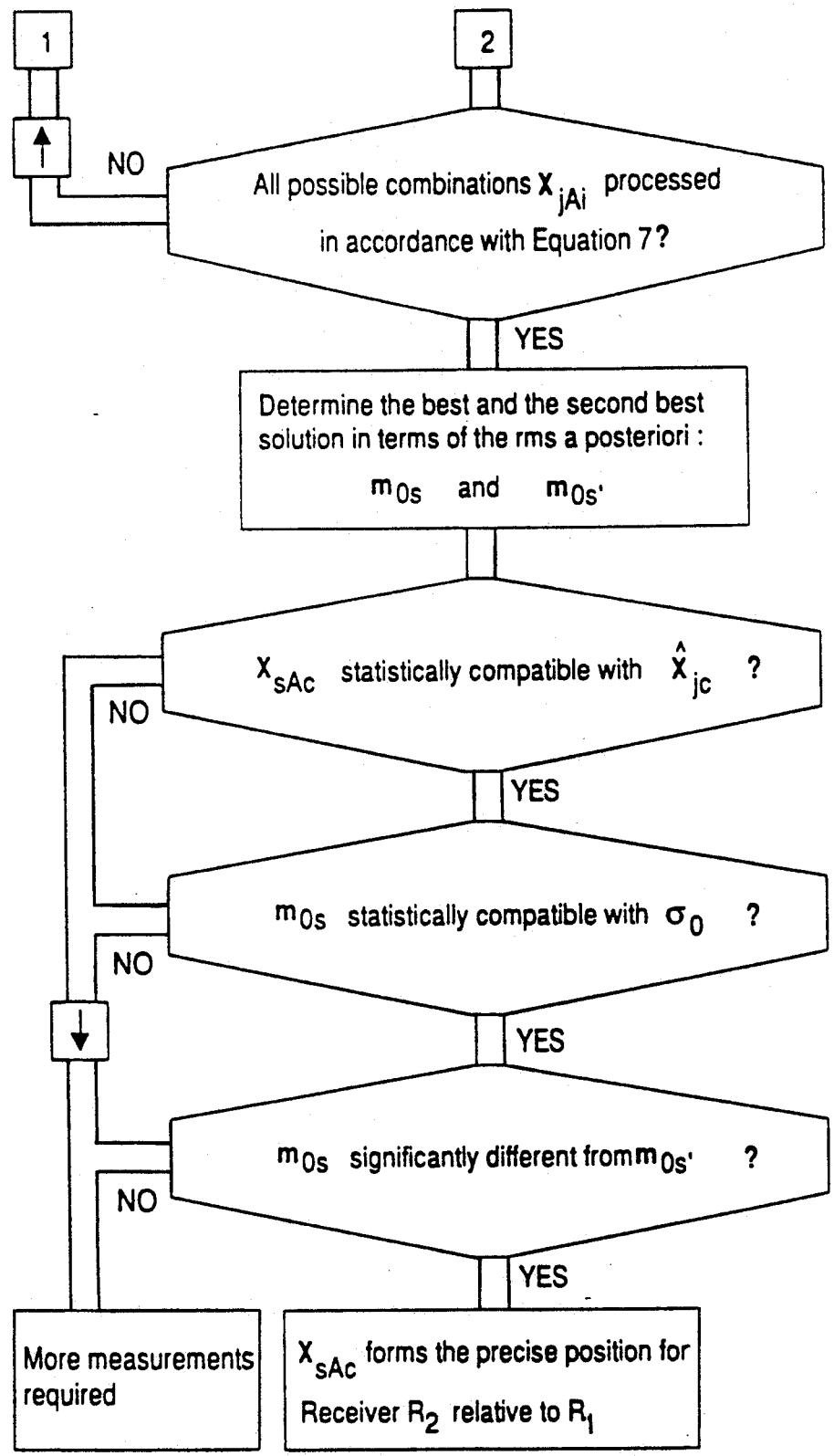
FIG. 3 is a flow diagram for the instant invention.

FIG. 1 illustrates a measuring arrangement for the instant invention and FIGS. 2 and 3 illustrate flow diagrams. FIGS. 2 and 3 connect at the boxes labeled "1" and "2".

In the manner known from static positioning using the GPS system (Beutler et al. 1984 (loc. cit.)), the method of precise position determination according to the exemplary embodiment provides for:

a) a first receiver $R_1$ at a measurement location $r_1$ b) a second receiver $R_2$ at a reference location $r_2$.

The position vector $x_c = r_1 - r_2$, whose magnitude corresponds to the oblique range from the measurement location to the reference location, is to be determined using the method.

The embodiment furthermore provides:

c) A number of 4 to 8 GPS satellite transmitters $S^n$, which radiate particular radio waves with the designation L1 (19 cm wavelength) and/or with the designation L2 (24 cm wavelength). The emitted radio waves transmit an identification and a position and synchronization statement of the individual transmitters $S^n$ (c.f. WILD Heerbrugg prospectus (loc. cit.)) with reference to a geodetic coordinate system.

d) Each receiver $R_i$ can determine a measured phase value $\phi_i{}^n(k)$, allocated unambiguously to a transmitter $S^n$, for a specific measurement time, which in each case is designated as an epoch $E_K$. In this case, with $|r_i{}^n|$ representing the distance from the transmitter $S^n$ to the receiver $R_i$ and $\lambda_f$ representing the wavelength of the L1 or L2 wave which is received, the relationship $$\phi_i{}^n(k) = (|r_i{}^n|/\lambda_f) - 2\pi n_i{}^n(k) \qquad \text{(Equation 1)}$$

holds in approximate form, where $n_{if}{}^n(k)$ is an integer which specifies the number of complete wave cycles which would be observed during the first measurement epoch between the satellites and the receiver. This value is designated the phase ambiguity ($n_{if}{}^n(k)$) and can be determined, however, only by suitable evaluation methods and is unknown for the individual measurement. The number j of the epochs $E_k$, for which the measured phase value $\phi_i{}^n(k)$ is determined lies between approximately 2 and 10 within a few minutes in the case of the method presented here, as opposed to around 60 distributed over a time period of an hour in the case of the known static positioning.

e) The measured phase values $\phi_i{}^n(k)$ are stored in the receivers $R_i$ together with the further data taken over from the transmitters and are supplied to an automatic data processing installation, it being possible to use known communications lines and/or transportable storage media such as magnetic diskettes.

Parts of the processing described in the following text can also take place at the individual receivers $R_i$.

f) Formed from the measured phase values $\phi_i{}^n(k)$ is their double difference $$\alpha\phi_{12}{}^{nm}(k) = (\phi_2{}^n(k) - \phi_1{}^n(k)) - (\phi_2{}^m(k) - \phi_1{}^m(k)) - 2\pi N^{nm} \qquad \text{(Equation 2)}$$

In this case, any transmitter $S^n$ is selected as the reference and all the double differences are formed with respect to this transmitter $S^n$. In the case of five received transmitters $S^1$ to $S^5$, $S^1$, for example, is taken as the reference and the double differences $\Delta\phi_{12}{}^{12}$, $\Delta\phi_{12}{}^{13}$, $\Delta\phi_{12}{}^{14}$, $\Delta\phi_{12}{}^{15}$ are formed for all j epochs $E_k$, $k = 1$ to $j$.

This results in a multidimensional equation system which, after linearization and statistical evaluation using the least squares method (c.f. Beutler et al. 1984, pp. 14–19, Equations (5), (6), pp. 76–78, Equations (7), (8)), produces an initial solution with solution vector.

$$\text{the solution vector } \hat{x}_j = Q_{xxj} \cdot \sum_{k=1}^{j} (A_k{}^T P_k L_k) \qquad \text{(Equation 4)}$$

of the corresponding cofactor matrix $$Q_{xxj} = \sum_{k=1}^{j} (A_k{}^T P_k A_k)$$

for the a posteriori rms error $$m_{0j} = \left[ \left( \sum_{k=1}^{j} (L_k{}^T P_k L_k) - \hat{x}_j{}^T (Q_{xxj})^{-1} \hat{x}_j \right) \frac{1}{n-u} \right]^{\frac{1}{2}}$$

where $A_k$ is the first design matrix
$P_k$ is the weighting matrix for the measurement } for the epoch $E_k$
$L_k$ is the observation vector $n$ is the total number of double diferences $\Delta\phi_{72}{}^{uin}$ $u$ is the number of unknown parameters.

In accordance with a first embodiment of the invention, the method is as follows:

The initial solution vector $\hat{x}_j$ contains the initial values $\hat{x}_{jc}$ for the position vector and the actual phase ambiguity $\hat{x}_{jN}$ values. Integer alternatives can be specified in one environment for the latter. One position vector $x_{jAC}$ belongs unambiguously to each set of integer alternatives $x_{jA}$, which position vector $x_{jAC}$ can be calculated by inserting this set of integer alternatives $x_{jA}$ as known variables in the determination equation (Equation 2). The position vector $x_{jAc}$ and the set $x_{jA}$ of integer alternatives thus form a consistent alternative $x_{jA}$ to the initial solution vector $\hat{x}_j$.

In a further step, it must be checked whether such an alternative $x_{jA}$ is statistically compatible with the initial solution vector $\hat{x}_j$.

Using statistical hypothesis testing means, the following probability statement is formed for this purpose $$P[(x_{jA} - \hat{x}_j)^T Q_{xxj}{}^{-1}(x_{jA} - \hat{x}_j) \leq u \cdot m_0{}^2 \cdot \xi_{Fu,f;1-\alpha}] = 1 - \alpha \qquad \text{(Equation 6)}$$

In this case, $\xi_{Eu,f;1-\alpha}$ is the range of the single-sided region $1-\alpha$, based on Fischer's probability density function F with u degrees of freedom and $n-u=f$.

According to this, an alternative $x_{jA}$ having an error probability $\alpha$ is statistically compatible with $\hat{x}_j$ when the inequality 6 is satisfied.

The confidence region is thus a u-dimensional hyperellipsoid, centered around $\hat{x}_j$, and each alternative $x_{jA}$ falling in this region is compatible with the initial solution vector $\hat{x}_j$.

Thus all these alternatives $x_{jA}$ must be determined.

With all these alternatives $x_{jA}$, the determination of the alternative $x_{sA}$, which is known from the static positioning or is described in more detail for the second embodiment, must then be carried out with the minimum rms error $m_{0s}$ as the solution.

This method is statistically precise and universally applicable, but does not yet reduce the number of alternatives $x_{jA}$ to be tested very considerably (a hypercuboid is reduced to a hyper ellipsoid) and thus still requires relatively high computer power.

The second embodiment of the invention drastically reduces the required computer power.

Using the initial solution vector $\hat{x}_j$, containing the position vector $\hat{x}_{jc}$ and the vector $\hat{x}_{jN}$, with the components $x_{Ni}$ as individual actual phase ambiguity values, the associated cofactor matrix $Q_{xxj}$ and the a posteriori rms error $m_{0j}$, a linear confidence region is formed for individual phase ambiguities $x_{Ni}$:

$$P[x_{Ni} - \xi_{Tf;1-\alpha/2} \cdot m_{xNi} \leq x_{ANi} \leq x_{Ni} + \xi_{Tf;1-\alpha/2} \cdot m_{xNi}] = 1 - \alpha \quad \text{(Equation 7)}$$

and one for the differences $x_{NiK}$ between individual phase ambiguities $x_{Ni}$, $x_{NK}$:

$$P[x_{Nik} - \xi_{Tf;1-\alpha/2} \cdot m_{xNik} \leq x_{ANik} \leq x_{Nik} + \xi_{Tf;1-\alpha/2} \cdot m_{xNik}] = 1 - \alpha \quad \text{(Equation 8)}$$

In this case, the following definitions apply:

$m_{xNi} = m_{0j} \cdot ([Q_{xxj}]_{ii})^{\frac{1}{2}}$
$x_{Nik} = x_{Ni} - x_{Nk}$; $i,k = 1, \ldots, r$; for $i = k$
$m_{xNik} = m_{0j} \cdot (q_{xNik})^{\frac{1}{2}}$
$q_{xNik} = [Q_{xxj}]_{hh} - 2 \cdot [Q_{xxj}]_{ht} + ]Q_{xxj}]_{tt}$; $h = i + \text{const.}$
$t = k - \text{const.}$ $x_{ANiK} = x_{ANi} - x_{ANK}$ $\xi_{T(n-u), 1-\alpha/2}$ is the single-sided band width of the confidence region $1 - \alpha$ in accordance with the Student's T-distribution.

Equation 7 defines a confidence region for each individual phase ambiguity $x_{Ni}$. The less precisely a determined phase ambiguity $x_{Ni}$ is determined by the initial solution, the more integer alternatives $x_{ANi}$ are located in the confidence region. All possible combinations of these integer alternatives $x_{ANi}$ form the quantity of the alternative phase ambiguity vectors $x_{hAN}$ with $N_1$ vectors.

The number $N_1$ of the vectors is given by $$N_1 = \prod_{i=1}^{\tau} (n_i)$$

With the help of Equation 8, the number of alternative phase ambiguity vectors $x_{hAN}$ for the further procedure is reduced by testing for their compatibility with the statistical information of the cofactor matrix $Q_{xxj}$.

For this purpose, a systematic arrangement of the phase ambiguity vectors $x_{hA}$ is introduced before Equation 8 is applied.

The first vector $x_{1A}$ contains the next integer number as the component $x_{Ai}$ for each actual individual component $x_{Ni}$ of the initial solution vector $x_j$.

The second vector $x_{2A}$ is identical to the first with the exception of the last component $x_{Ar}$, which assumes the next but one integer value. The following vectors contain the next but two and next but three value etc. as the last component, until all the integer values in accordance with Equation 7 for $x_{Ar}$ are utilized.

The next group of vectors begins with the next but one integer value for $x_{A(r-1)}$ and the next integer values for all the other components. Once again, $x_{Ar}$ is modified sequentially and thus produces this next group.

This procedure is repeated until all the possible combinations of the integer alternatives $x_{Ai}$ in accordance with Equation 7 are sorted.

The test according to Equation 8 is carried out with the difference $x_{AN12}$ of the first ($x_{A1}$) and second ($x_{A2}$) components of the vector $x_{1AN}$.

If Equation 8 is not satisfied, then $$N_2 = \prod_{i=3}^{\tau} (n_i)$$

vectors $x_{1A}$ to $x_{N2A}$ are eliminated since these do not all simultaneously satisfy Equation 8 in the case of the selected sequence of the vectors $x_{hA}$.

In contrast, if Equation 8 is satisfied, Equation 8 is formed with the difference $x_{A13}$ and $x_{A23}$ of the vector $x_{1A}$. If Equation 8 is not satisfied with one of these differences, then the next $$N_3 = \prod_{i=4}^{\tau} (n_i)$$

vectors are eliminated.

If both differences satisfy Equation 8, then the differences for the fourth and thereafter for the fifth etc. components are formed up to the last component $x_{Ar}$ in $x_{1A}$.

This method step of the test in accordance with Equation 8 must be carried out for all vectors $x_{hA}$ which have not already been eliminated with others as a result of a negative finding. In this case, the index number h of the next vector is determined respectively as the sum of the index number h of the last vector considered plus the number of vectors eliminated.

The result contains a selection of integer phase vectors $x_{aA}$, where $a = 1 \ldots v$ which are compatible with Equations 7 and 8. $v$ designates the number of compatible vectors.

The following method steps now need to be carried out only with this selection of vectors $x_{aA}$ from the quantity of vectors $x_{hA}$ obtained in a rational manner:

h) The corresponding location vector $x_{aAc}$ (solution vector) and the rms error $m_{0a}$ are determined for each vector $x_{aA}$ by insertion in the determination equation, Equation 4.

i) The vector $x_{sA}$ with the minimum rms error $m_{0s}$ is determined.

1) The statistical compatibility of this solution with the given preconditions is tested, to be precise as follows:

1a) The corresponding location vector $x_{sAc}$ is tested for statistical compatibility with the initial value $\hat{x}_{jc}$.

1b) The compatibility of the rms error $m_{0s}$ with the a priori variance $\sigma_0$ is investigated using the statistical hypothesis method of the $\psi^2$ test according to Vanicek, P., Krakiswky, E., "Geodesy: The Concepts". Second Edition. North Holland 1986. ISBN 0-444-87777-0.

For this purpose, the null hypothesis is:
$H_0: m_{0s}^2 = \sigma_0^2$
and the alternative hypothesis: $H_1: m_{0s}^2 \neq \sigma_0^2$.
$m_{0s}$ and $\sigma_0$ are compatible when $$\xi \psi^2 f/f;\alpha/2 \leq \frac{m_{0s}^2}{\sigma_0^2} \leq \xi \psi^2 f/f;1 - \alpha/2$$

that is to say, the quotient $m_{0s}^2/\sigma_0^2$ lies within the limits of the $1 - \alpha$ confidence region. $\psi^2 f/f$ is the probability density therefor in the case of $f = n - u$ degrees of freedom.

1c) The significance of the difference from $m_{0s}$ to the second-smallest rms error $m_{0s}$ is tested using the F-test according to Vanicek, Krakiwsky (loc. cit.). For this purpose, the null hypothesis is $H_0: m_{0s}^2 = m_{0s'}^2$ and the alternative hypothesis is: $H_1: m_{0s}^2 \neq m_{0s'}^2$.

$m_{0s}$ and $m_{0s'}$ are regarded as being not significantly different when $$\frac{m_{0s}^2}{m_{0s'}^2} \leq \xi F b1, b2, 1 - \alpha/2$$

In this case, $\xi\, F\, b1, b2, 1 - \alpha/2$ is the limit of the $1 - \alpha$ confidence region in accordance with Fischer's probability density function F with $b_1$ and $b_2$ degrees of freedom for the determination of $m_{0s}$ and $m_{0s'}$.

If Equation 10 is true, then the integer phase ambiguities $x_N$ cannot be determined unambiguously with the existing data.

The same applies when (1a) $x_{sAC}$ is not compatible with $\hat{x}_{jc}$ or (1b) Equation 9 is not satisfied. In all these cases, an error message is thus produced as a result of the evaluation.

m) The method thus ensures that no results are produced which cannot yet be statistically unambiguously safeguarded with the existing measurement data. Intervention and assessment by the user is thus no longer necessary.

So far, the method has been described for the use of an individual frequency (L1 or L2) or wavelength ($\lambda_1$ or $\lambda_2$). However, the measurements for two frequencies (L1 and L2) can be evaluated directly, in succession, using the method, and in this case the transmitters are simply considered individually per frequency.

However, it is particularly advantageous to utilize the mutual coupling of the measurements between identical transmitters and receivers with two transmission frequencies. This is because the distance is, of course, identical for both frequencies, apart from signal propagation influences in the atmosphere.

If the components $x_{Ni}$ and $x_{Nk}$ of the initial solution vector $\hat{x}_j$ belong to the same constellation of satellites $S^n$ and receivers $R_j$, but to frequencies L1 and L2, then the linear combination $$x_{Lik} = x_{Ni} - \frac{\lambda_2}{\lambda_1} \cdot x_{Nk}$$

has only a very small rms error $m_{xLik}$.

For the integer alternatives $x_{Ai}$ and $x_{Ak}$ and their linear combination $$x_{ALik} = x_{Ai} - \frac{\lambda_2}{\lambda_1} \cdot x_{Ak}$$

an additional extremely stringent criterion can thus be set:

$$P_i[x_{Lik} - \xi T_{f;1-\alpha/2} \cdot m_{xLik} \leq x_{Alik} \leq x_{Lik} + \xi T_{f;1-\alpha/2} \cdot m_{xLik}] = 1 - \alpha \quad \text{(Equation 11)}$$

When a pair of integer alternatives $x_{Ai}$ and $x_{Ak}$ associated with the same transmitter $S^n$ and receiver $R_i$ at different frequencies L1 and L2 fail to satisfy the condition of Equation 11, then all the combinations $x_{hA}$ with this pair $x_{Ai}$ and $x_{Ak}$ must be excluded from further evaluation.

Equation 11 is thus inserted in parallel with Equation 8 in the method when measurements are present at two frequencies (L1 and L2) and results in an additional drastic reduction in the number of integer alternatives $x_{aA}$.

The performance capability of the method is shown using the examples described in the following text.

Measurement data are used for this purpose which were recorded during the "Turtmann-Kampagne 89" using WM 102 receivers at the position "TURT" and "ERGI" with an oblique range of 2 km and a height difference of 500 m on Jul. 7, 1989, using GPS satellites Nos. 6, 8, 9, 11, 12 which could be accessed, and these data are presented evaluated in accordance with the relative static positioning method (Beutler et al. (loc. cit.)).

These data are documented in Beutler, G., "Exemplary Processing of a 1989 Campaign in the Swiss Alps". Astronomical Institute of the University of Bern, 1989.

For the examples, measurement data were taken on the basis of number, time distribution and frequency, in different combinations. As the reference $x_{CT}$, $X_{NT}$, the best data from the abovementioned Turtmann Kampagne '89 are quoted in the examples.

A first Example 1, which evaluates L1 and L2 measured values for five satellites from six successive epochs for a measurement time of one minute in each case, and thus uses $n = 47$ double differences of the measured phase values $\Delta\phi_{12}^{nm}(k)$ in the case of a missing L2 measurement, is presented in the Tables 1 to 6.

As a result of the initial solution, Table 1 shows the individual phase ambiguities $x_{Ni}$ and their rms errors $m_{xNi}$. The "true" phase ambiguities $x_{NTi}$ are quoted as a result for comparison, from Beutler (loc. cit.).

TABLE 1

| i | Freq. | $S^m$ | $S^n$ | $x_{Ni}$ | $m_{xNi}$ | $x_{NTi}$ |
|---|---|---|---|---|---|---|
| 1 | L1 | 6 | 12 | −9.07 | 0.78 | −8 |
| 2 | L1 | 9 | 12 | −2.74 | 0.31 | −3 |
| 3 | L1 | 8 | 12 | −10.26 | 0.83 | −9 |
| 4 | L1 | 11 | 12 | −17.53 | 0.44 | −18 |
| 5 | L2 | 6 | 12 | −6.84 | 0.61 | −6 |
| 6 | L2 | 9 | 12 | −1.83 | 0.24 | −2 |
| 7 | L2 | 8 | 12 | −6.98 | 0.65 | −6 |
| 8 | L2 | 11 | 12 | −13.69 | 0.34 | −14 |

The a posteriori rms error is $m_{0j} = 3$ mm.

The rms errors $m_{xNi}$ are in the range from 0.2 to 0.8 cycles. A direct definition at the next integer would lead to false results, as the comparison with the values $x_{NTi}$ shows.

Table 2 shows the coordinates of the measurement location ($R_1$) for the initial solution and the distance $|x_c|$ between the reference $R_2$ and the measurement location $R_1$ in comparison with the values $x_{CT}$ from Beutler et al. (loc. cit.) which are known as "true". The deviations are in the region of half a meter.

TABLE 2

| | $x_c$ [m] | $x_{ct}$ [m] | $\Delta x_c$ [m] |
|---|---|---|---|
| $r_x$ | 4375518.973 | 4375519.764 | 0.791 |
| $r_y$ | 593010.606 | 593010.699 | 0.093 |
| $r_z$ | 4588793.269 | 4588793.382 | 0.113 |
| $|x_c|$ | 2005.187 | 2005.675 | 0.488 |

To achieve the required measurement accuracy, it is thus necessary to determine the integer phase ambiguities $x_{aA}$. To this end, a quantity of alternative phase ambiguity vectors $x_{hA}$ are initially determined with $x_{Ni}$ and $m_{xNi}$ according to Equation 7.

In this case, it is established for Equations 7 and 8 that $\xi_{Tf,1-\alpha/2}=3,6$ where $f=36$ and $\alpha=0.1\%$.

Table 3 shows the differences $x_{Nik}$ to be inserted in Equation 8 between the phase ambiguities and the associated rms errors $m_{xNik}$, in comparison to the "true" differences $x_{NTik}$.

TABLE 3

| i | k | $x_{Nik}$ | $m_{xNik}$ | $x_{NTik}$ |
|---|---|---|---|---|
| 1 | 2 | −6.33 | 0.52 | −5 |
| 1 | 3 | 1.19 | 0.06 | 1 |
| 1 | 4 | 8.46 | 0.53 | 10 |
| 1 | 5 | −2.24 | 0.17 | −2 |
| 1 | 6 | −7.24 | 0.58 | −6 |
| 1 | 7 | −2.10 | 0.13 | −2 |
| 1 | 8 | 4.62 | 0.56 | 6 |
| 2 | 3 | 7.52 | 0.58 | 6 |
| 2 | 4 | 14.79 | 0.23 | 15 |
| 2 | 5 | 4.09 | 0.36 | 3 |
| 2 | 6 | −0.92 | 0.07 | −1 |
| 2 | 7 | 4.23 | 0.41 | 3 |
| 2 | 8 | 10.95 | 0.18 | 11 |
| 3 | 4 | 7.27 | 0.58 | 9 |
| 3 | 5 | −3.43 | 0.23 | −3 |
| 3 | 6 | −8.43 | 0.63 | −7 |
| 3 | 7 | −3.28 | 0.18 | −3 |
| 3 | 8 | −3.43 | 0.62 | 5 |
| 4 | 5 | −10.69 | 0.39 | −12 |
| 4 | 6 | −15.70 | 0.26 | −16 |
| 4 | 7 | −10.55 | 0.43 | −12 |
| 4 | 8 | −3.84 | 0.10 | −4 |
| 5 | 6 | −5.01 | 0.41 | −4 |
| 5 | 7 | 0.14 | 0.05 | 0 |
| 5 | 8 | 6.86 | 0.41 | 8 |
| 6 | 7 | 5.15 | 0.45 | 4 |
| 6 | 8 | 11.86 | 0.18 | 12 |
| 7 | 8 | 6.71 | 0.45 | 8 |

In this case, $x_{N15}$, $x_{N26}$, $x_{N37}$ and $x_{N48}$ are differences between identical satellites (transmitters) and different frequencies L1, L2.

The test in accordance with Equation 11 can also be carried out for these differences, with the linear combinations $x_{Lik}$ and their rms errors $m_{xLik}$. Table 4 shows the $x_{Lik}$ and $m_{xLik}$ in comparison with "true" linear combination $x_{LTik}$.

TABLE 4

| L1 | L2 | $x_{Lik}$ | $m_{xLik}$ | $x_{LTik}$ |
|---|---|---|---|---|
| 1 | 5 | −0.30 | 0.01 | −0.30 |
| 2 | 6 | −0.40 | 0.01 | −0.43 |
| 3 | 7 | −1.31 | 0.01 | −1.30 |
| 4 | 8 | −0.05 | 0.01 | −0.03 |

In this example, there are over 1,800 alternative phase ambiguity vectors $x_{hA}$ which satisfy Equation 7.

However, only two vectors $x_{aA}$ still satisfy Equation 8.

The application of Equation 11 is thus superfluous in this example.

Table 5 shows the significant difference between the rms errors $m_{0s}$ and $m_{0s'}$ and the two vectors in accordance with the F-test (Equation 10):

TABLE 5

| $x_{aA}$ | $M_{0a}$ | $\frac{m_{01}^2}{m_{02}^2}$ | $\xi Ff,f,1-\alpha/2$ ($\alpha=5\%$) | Test |
|---|---|---|---|---|
| 1 | $m_{0s}=4$ | | | |
| 2 | $m_{0s'}=14$ | 12.2 | 1.8 | |

The first vector with the minimum rms error also satisfies the tests described above under 1a) and 1b) and is thus the solution $x_c$ of the problem, or the measurement result, shown in Table 6 in comparison with the "true" values according to Beutler et al. 1984, as has already been shown in Table 2 for the initial solution $\hat{x}_c$. The deviations are now in the millimeter region.

TABLE 6

|  | $x_c$ [m] | $x_{cT}$ [m] | $\Delta x_c$ [m] |
|---|---|---|---|
| $r_x$ | 4375519.764 | 4375519.764 | 0.000 |
| $r_y$ | 593010.699 | 593010.699 | 0.000 |
| $r_z$ | 4588793.361 | 4588793.382 | −0.021 |
| $|x_c|$ | 2005.682 | 2005.675 | 0.007 |

Example 2 uses only one frequency L1, for example since only relatively simple single-frequency receivers R, R$_2$ are available. Once again, five transmitting satellites S$^n$ are received over six epochs E$_K$ in 5 minutes. In consequence, n=24 double differences $\Delta\phi_{12}^{nm}(k)$ of the measured phase values are available and are processed.

The initial solution is shown in Table 7. The a posteriori rms error is $m_{0j}=3.2$ mm.

TABLE 7

| No. | Freq. | S$^m$ | S$^n$ | $x_{Ni}$ | $m_{xni}$ | $x_{NTi}$ |
|---|---|---|---|---|---|---|
| 1 | L1 | 6 | 12 | −8.71 | 1.15 | −8 |
| 2 | L1 | 9 | 12 | −2.69 | 0.47 | −3 |
| 3 | L1 | 8 | 12 | −9.86 | 1.22 | −9 |
| 4 | L1 | 11 | 12 | −17.31 | 0.65 | −18 |

For determining the integer phase ambiguities $x_{jA}$, $\xi_{Tf/1-\alpha/2}=3.7$, f=17, $\alpha=0.1\%$ are set in order to define the confidence regions.

In this example 67·10$^3$ different $x_{hA}$ satisfy Equation 7, but only 1.6·10$^3$ $x_{aA}$ satisfy Equation 8.

The associated alternative position vector $x_{aAc}$ and the rms error $m_{0a}$ are determined for all these in accordance with method step h).

Table 8 shows the rms error $m_{0a}$ for the five vectors $x_{aAN}$, a=1 to 5 with the smallest $m_{0a}$.

TABLE 8

| $x_{aA}$ | $m_{0a}$ | $\frac{m_{01}^2}{m_{0a}^2}$ | $\xi Ff,f,1-\alpha/2(\alpha=5\%)$ | Test |
|---|---|---|---|---|
| a = 1 | 3.0 | | | |
| 2 | 3.1 | 0.60 | 2.30 | + |
| 3 | 3.1 | 0.60 | 2.30 | + |
| 4 | 3.5 | 0.76 | 2.30 | + |
| 5 | 3.7 | 0.85 | 2.30 | + |

However, all $m_{0a}$ lie in the confidence region of the F-test (in accordance with Equation 10) so that $x_{1A}$ with the minimum rms error $m_{01}$ cannot be specified as a solution.

More measurement data would be required for a reliable determination. There now follows a message demanding additional measurement data.

Example 3 is likewise restricted to one frequency L1, but uses two blocks therefrom, each of six epochs of one minute at a time interval of one hour. Once again, 5 transmitters are available and hence n=48 double differences $\Delta\phi_{12}{}^{nm}$ (k). In this case, transmitter 8 is received in the first block, said transmitter being replaced by transmitter 13 in the second block. Once again, Table 9 gives the initial solution therefor.

TABLE 9

| i | Freq. | $S^m$ | $S^n$ | $x_{Ni}$ | $m_{xNi}$ | $x_{NTi}$ |
|---|---|---|---|---|---|---|
| 1 | L1 | 6 | 12 | −8.02 | 0.88 | −8 |
| 2 | L1 | 9 | 12 | −2.69 | 0.40 | −3 |
| 3 | L1 | 8 | 12 | −9.06 | 0.93 | −9 |
| 4 | L1 | 11 | 12 | −17.59 | 0.52 | −18 |
| 5 | L1 | 6 | 12 | −6.86 | 0.36 | −7 |
| 6 | L1 | 9 | 12 | −2.49 | 0.84 | −2 |
| 7 | L1 | 11 | 12 | −11.86 | 0.42 | −12 |
| 8 | L1 | 13 | 12 | −20.58 | 0.37 | −21 |

$m_{0j} = 3.2$ mm

In this case: $\xi_{Tf,1-\alpha/2}=3.6$, f=37, $\alpha=0.1\%$.

In accordance with Equation 7, there are thus $8 \times 10^8$ vectors $x_{hA}$, after applying Equation 8 there are still only $1 \times 10^4$ vectors $x_{aA}$.

TABLE 10

| $x_{aAN}$ | $m_{0a}$ | $\dfrac{m_{01}^2}{m_{0a}^2}$ | $\xi F f,f, 1 - \alpha/2 (\alpha = 5\%)$ | Test |
|---|---|---|---|---|
| 1 | | | | |
| 2 | 8.7 | 2.10 | 1.80 | − |
| 3 | 11.5 | 3.67 | 1.80 | − |
| 4 | 11.6 | 3.74 | 1.80 | − |
| 5 | 12.1 | 4.07 | 1.80 | − |

For the five $x_{aA}$ with the smallest rms errors $m_{0a}$ in accordance with the $\psi^2$ test (Equation 10), Table 10 shows a significant difference in the minimum rms error $m_{01}$.

$m_{01}$ and $x_{1A}$ also pass the tests in accordance with 1a) and 1b), so that the result is produced as a measured value (Table 11).

TABLE 11

| | $x_c$ [m] | $x_{cT}$ [m] | $\Delta x_c$ [m] |
|---|---|---|---|
| $r_x$ | 4375519.727 | 4375519.764 | −0.037 |
| $r_y$ | 593010.692 | 593010.699 | −0.007 |
| $r_z$ | 4588793.351 | 4588793.382 | −0.031 |
| $|x_c|$ | 2005.658 | 2005.675 | −0.017 |

Under conditions which are otherwise identical to Example 1, Example 4 uses only two epochs $E_1$, $E_2$ in a measurement time of two minutes.

16 double differences $\Delta\phi_{12}{}^{nm}$ (k) are thus given.

TABLE 12

| i | Freq. | $S^m$ | $S^n$ | $x_{Ni}$ | $m_{xNi}$ | $x_{NTi}$ |
|---|---|---|---|---|---|---|
| 1 | L1 | 6 | 12 | −5.05 | 2.83 | −9 |
| 2 | L1 | 9 | 12 | −1.40 | 1.13 | −3 |
| 3 | L1 | 8 | 12 | −4.92 | 3.02 | −9 |
| 4 | L1 | 11 | 12 | −13.64 | 1.57 | −18 |
| 5 | L2 | 6 | 12 | −3.92 | 2.20 | −7 |
| 6 | L2 | 9 | 12 | −0.78 | 0.88 | −2 |
| 7 | L2 | 8 | 12 | −2.82 | 2.36 | −6 |
| 8 | L2 | 11 | 12 | −10.67 | 1.22 | −14 |

TABLE 13

| | $x_c$ [m] | $x_{cT}$ [m] | $\Delta x_c$ [m] |
|---|---|---|---|
| $r_x$ | 4375519.959 | 4375519.764 | 0.195 |
| $r_y$ | 593010.228 | 593010.699 | 0.471 |
| $r_z$ | 4588793.523 | 4588793.382 | 0.141 |

TABLE 13-continued

| | $x_c$ [m] | $x_{cT}$ [m] | $\Delta x_c$ [m] |
|---|---|---|---|
| $|x_c|$ | 2005.383 | 2005.675 | 0.292 |

The initial solution is shown in Table 12. The a priori rms error is $m_{0j}=2.0$ mm. Table 13 also shows the initial value compared with the "true" position result $x_{cT}$.

The rms errors $m_{xNi}$ are between 1 and 3.

This means that over $10^{11}$ different vectors $x_{hA}$ satisfy Equation 7 when: $\xi_{Tf,1-\alpha/2}=6.9$, f=5, $\alpha=0.1\%$.

Apart from Equation 8, Equation 11 can also be used here to limit the number of alternatives, since measurements were carried out at two frequencies L1 and L2.

Table 14 shows the linear combinations $x_{Lik}$ which can be used for this purpose, their rms errors $m_{xLik}$ and, in comparison, the "true" combinations $x_{LikT}$.

TABLE 14

| i | k | $x_{Lik}$ | $m_{xLik}$ | $x_{LikT}$ |
|---|---|---|---|---|
| 1 | 5 | −0.02 | 0.01 | −0.02 |
| 2 | 6 | −0.40 | 0.01 | −0.43 |
| 3 | 7 | −1.30 | 0.01 | −1.30 |
| 4 | 8 | 0.05 | 0.01 | −0.03 |

After applying the selection in accordance with Equation 8 and Equation 11, only 14 vectors $x_{aA}$ still remain, for which the associated $x_{aAc}$ and $m_{0a}$ are to be determined. Table 15 shows these for the five $x_{aA}$ with the smallest $m_{0a}$. The F-test in accordance with Equation 10 leads to significant deviations of $m_{0a}$, a=2 to 5, from $m_{01}$.

TABLE 15

| $x_{aAN}$ | $m_{0a}$ | $\dfrac{m_{01}^2}{m_{0a}^2}$ | $\xi F f,f,1 - \alpha/2 (\alpha = 5\%)$ | Test |
|---|---|---|---|---|
| 1 | 4.0 | | | |
| 2 | 10.0 | 6.2 | 2.6 | − |
| 3 | 21.1 | 9.1 | 2.6 | − |
| 4 | 21.6 | 29.2 | 2.6 | − |
| 5 | 26.3 | 42.0 | 2.6 | − |

The solution vectors $x_{1A}$ and $m_{0a}$ also passed the tests in accordance with 1a) and 1b), so that the result is indicated in accordance with Table 16.

TABLE 16

| | $x_c$ [m] | $x_{cT}$ [m] | $\Delta x_c$ [m] |
|---|---|---|---|
| $r_x$ | 4375519.760 | 4375519.764 | 0.004 |
| $r_y$ | 593010.700 | 593010.699 | −0.001 |
| $r_z$ | 4588793.363 | 4588793.382 | 0.019 |
| $|x_c|$ | 2005.679 | 2005.675 | −0.004 |

The examples show how the described method leads to unambiguous results without any operator decisions, and that considerably reduced measurement complexity leads to precise position determination.

| Equation symbols | |
|---|---|
| Phase measurement | |
| $R_i$ | Receiver No. i |
| $r_i$ | Location vector of $R_i$ (measurement location, reference location) |
| $S^n$ | Transmitter No. n |
| $r_i{}^n$ | Transmitter (n) - receiver (i) - distance vector |
| Lf | f = 1; 2 Carrier frequencies of the GPS system |
| $\lambda_f$ | Wavelength of Lf |

-continued
Equation symbols

| | |
|---|---|
| $E_k$ | Time epoch Nos. k, k ∈ (1, ..., j) |
| $\Phi_{ij}{}^n(k)$ | Measured phase value for $S^n$, $R_i$, $E_k$ |
| $n_{ij}{}^n(k)$ | Phase ambiguity of $\Phi_{ij}{}^n(k)$ at Lf (additive integer) |
| $\Delta\Phi_{12}{}^{nm}(k)$ | Double difference of the measured phase values for $S^n$, $S^m$, $R_1$, $R_2$, $E_k$ |
| $L_k$ | Observation vector for $E_k$ |
| $P_k$ | Weighting matrix for $L_k$ |
| $A_k$ | First design matrix for $E_k$ |
| Solution | |
| $x$Index c | Position vector (magnitude sought and its approximations), Dimension 3 |
| $x$Index N | Vector of the phase ambiguities, Dimension u |
| $x$Index | Solution vector, $x = (x_c, x_N)$ |
| $x$Index | Components of $x_{Index}$ |
| Index$_A$ | Consistent alternatives, alternative phase ambiguity (replaces Index N) |
| Index$_j$ | Solution with j items, $E_k$ |
| Index$_{i,k,n,a}$ | Running index of alternatives |
| $\hat{x}_{Index}$, $\tilde{x}_{Index}$ | Initial solution as the result of a compensation calculation |
| $Q_{xxj}$ | Corresponding cofactor matrix for $\hat{x}_j$ (Equation 3) |
| Statistics | |
| $m_{0Index}$ | a posteriori rms error (Equation 4) |
| $\sigma_0$ | a priori variance of the initial solution ($\hat{x}$) |
| Index s | Smallest $m_0$ |
| Index s' | Second smallest $m_0$ |
| n | Number of double differences $\Delta\Phi_{12}{}^{nm}(k)$ n = [(number) ($R_i$) · number ($S^n$)) − 1] · j |
| u | Dimension of x = number of unknown parameters |
| f | f = n-u, degrees of freedom |
| Statistics | |
| P [...] | Hypothesis |
| 1-α | Single-sided confidence region Range |
| F | Fischer's probability density function |
| T | Student's T-distribution |

I claim:

1. A method of precise position determination
   a) of a first receiver ($R_1$) at a measurement location ($r_1$) relative to
   b) a second receiver ($R_2$) at a reference location ($r_2$),
   c) using a number of transmitters ($S^n$) of electromagnetic radiation, which is received by the receivers ($R_1$, $R_2$) and whose position is known relative to one another and relative to the two receives ($R_1$, $R_2$) at a time of a measurement with a certain accuracy,
   d) each receiver ($R_1$, $R_2$) producing a measured phase value ($\phi_i{}^n(k)$) per transmitter ($S^n$) for a number of time epochs ($E_k$), which measured phase value, except for an additive complete phase ambiguity ($n_{ij}{}^n(k)$), determines quotients of a transmitter-receiver distance ($|r_i{}^n|$) and a wavelength ($\lambda_f$) of the electromagnetic radiation precisely and
   e) the measured phase values ($\phi^n(k)$) and the position of the transmitters ($S^n$) stored for each epoch ($E_k$) and supplied to an automatic data processing installation wherein they are processed in a program-controlled manner,
   f) an initial solution produced using a compensation calculation unit by forming a double difference ($\Delta\phi_{12}{}^{nm}(k)$) of measured phase values ($\phi_i{}^n(k)$) for each pair of transmitters ($S^n$, $S^m$),
      fa) a solution vector ($\hat{x}_j$) of which initial solution contains as components ($\hat{x}_{ji}$) approximate values for 3 components of the position vector to be determined ($\hat{x}_{jc}$) and actual approximate values of all phase ambiguities ($\hat{x}_{jN}$) and which, at the same time, provides
      fb) a corresponding cofactor matrix ($Q_{xxj}$) and
      fc) an a posteriori rms error ($m_{0j}$);
   g) according to which, integer alternative phase ambiguities ($x_{jAi}$) are formed within an interval characterized by the a posteriori rms error ($m_0$) around each actual phase ambiguity ($x_{jNi}$) and
   h) various combinations ($x_{jA}$) of alternative phase ambiguities ($x_{jAi}$) are used as known variables to determine alternative position vectors ($x_{jAc}$) and associated rms errors ($m_{0j}$),
   i) the alternative position vector ($x_{sAc}$) with the minimum rms error ($m_{0s}$) is determined; wherein
   j) combinations ($x_{jA}$) of alternative phase ambiguities ($x_{jAi}$) formed are subjected to a statistical selection test which takes into account a correlation of the phase ambiguities ($x_{jAi}$), which is characterized by a corresponding cofactor matrix ($Q_{xxj}$) and a posteriori rms error ($m_0$, and
   k) only the combinations ($x_{jA}$) of alternative phase ambiguities ($x_{jAi}$) which have passed the selection test are used as known variables to determine alternative position vectors ($x_{jAc}$) and associated rms errors ($m_{0j}$);
   l) the minimum rms error ($m_{0s}$) is tested to determine whether
      1a) the associated alternative position vector ($x_{sAc}$) can be statistically combined with the position vector ($\hat{x}_{jC}$) of the initial solution and
      1b) the minimum rms error ($m_{0s}$) can be statistically combined with an a priori variance ($\sigma_0$) of the initial solution, and
      1c) the difference with respect to the second smallest rms error ($m_{0s'}$) is statistically significant,
   m) in the presence of these conditions for the minimum rms error ($m_{0s}$), the alternative position vector ($x_{sAC}$) having the minimum rms error ($m_{0s}$) is produced as the measured value of the precise position determination.

2. The method as claimed in claim 1, wherein in each case two transmitters ($S^n$, $S^m$) of different frequencies (L1, L2) assume the same position and the receivers ($R_1$, $R_2$) for signals of different frequencies ($L_1$, $L_2$) produce separate measured phase values ($\phi_i{}^n(k)$).

3. The method as claimed in claim 1, wherein a statistical selection test for combinations ($x_{jA}$) of the alternative phase ambiguities is carried out in accordance with the condition:

$$P[(x_{jA} - \hat{x}_j)^T Q_{xxj}^{-1} (x_{jA} - \hat{x}_j) \leq u \cdot m_{0j}^2 \cdot \xi Fu, f; 1 - \alpha] = 1 - \alpha$$

4. The method as claimed in claim 1, wherein a statistical selection test for the combinations ($x_{jA}$) of the alternative phase ambiguities is carried out in accordance with the conditions:

$$P[x_{Ni} - \xi Tf; 1-\alpha/2 \cdot m_{xNi} \leq x_{ANi} \leq x_{Ni} + \xi Tf; 1-\alpha/2 \cdot m_{xNi}] = 1-\alpha$$

$$P[x_{Nik} - \xi Tf; 1-\alpha/2 \cdot m_{xNik} \leq x_{Anik} \leq x_{Nik} + \xi Tf; 1-\alpha/2 \cdot m_{xNik}] = 1-\alpha$$

$$\xi\psi^2 f/f; \alpha/2 \leq \frac{m_{0s}^2}{\sigma_0^2} \leq \xi\psi^2 f/f; 1-\alpha/2$$

-continued $$\frac{m_{0s}^2}{m_{0s'}^2} \leq \xi F_{b1,b2,1} - \alpha/2$$

5. The method as claimed in claim 4, wherein the statistical selection test additionally comprises the condition:

$$P[x_{Lik} - \xi T_{f;1-\alpha/2} \cdot m_{xLik} \leq x_{ALik} \leq x_{Lik} + \xi T_{f;1-\alpha/2} \cdot m_{xLik}] = 1 - \alpha$$

6. A method of precise position determination of a first receiver at a measurement location relative to a second receiver at a reference location using a plurality of transmitters of electromagnetic radiation which is received by the first and second receivers, the method comprising the steps of:
   (a) producing a measured phase value for each transmitter for a number of time epochs for each of the first and second receivers, the measured phase values indicating a transmitter-receiver distance and a wavelength of electromagnetic radiation;
   (b) supplying measured phase values and transmitter position information for each time epoch to an automatic data processing unit;
   (c) producing, in the automatic data processing unit, an initial solution by forming a double difference of measured phase values for each pair of transmitters, a solution vector of the initial solution containing as components approximate values for three components of a position vector being determined and actual approximate values of phase ambiguities, the solution vector providing a corresponding cofactor matrix and an a posteriori rms error;
   (d) forming, int eh automatic data processing unit, integer alternative phase ambiguities within an interval defined by a posteriori rms error around an actual phase ambiguity;
   (e) determining in the automatic data processing unit, alternative position vectors and associated rms errors using combinations of the alternative phase ambiguities as known variables and determining an alternative position vector with a minimum rms error;
   (f) subjecting, in the automatic data processing unit, combinations of the alternative phase ambiguities to a statistical selection test which uses a correlation of phase ambiguities characterized by a corresponding cofactor matrix and a posteriori rms error;
   (g) determining, in the automatic data processing unit, alternative position vectors and associated rms errors using combinations of alternative phase ambiguities which have passed the statistical selection test as known variables;
   (h) determining, in the automatic data processing unit, whether an associated alternative position vector can be statistically combined with a position vector of the initial solution, whether a minimum rms error can be statistically combined with an a priori variance of the initial solution, and whether a difference associated with a second smallest rms error is statistically significant; and
   (i) producing, in the automatic data processing unit, an alternative position vector having a minimum rms error as a measured value of precise position determination.

7. A method as claimed in claim 6, wherein at least two of the plurality of transmitters assume the same position and transmit different frequencies and wherein the first and second receivers produce separate measured phase values for signals of different frequencies.

* * * * *